W. J. LEIGHTY & B. H. KRAFFT.
STORM SHIELD.
APPLICATION FILED MAY 12, 1913.
1,186,010.
Patented June 6, 1916.
2 SHEETS—SHEET 1.
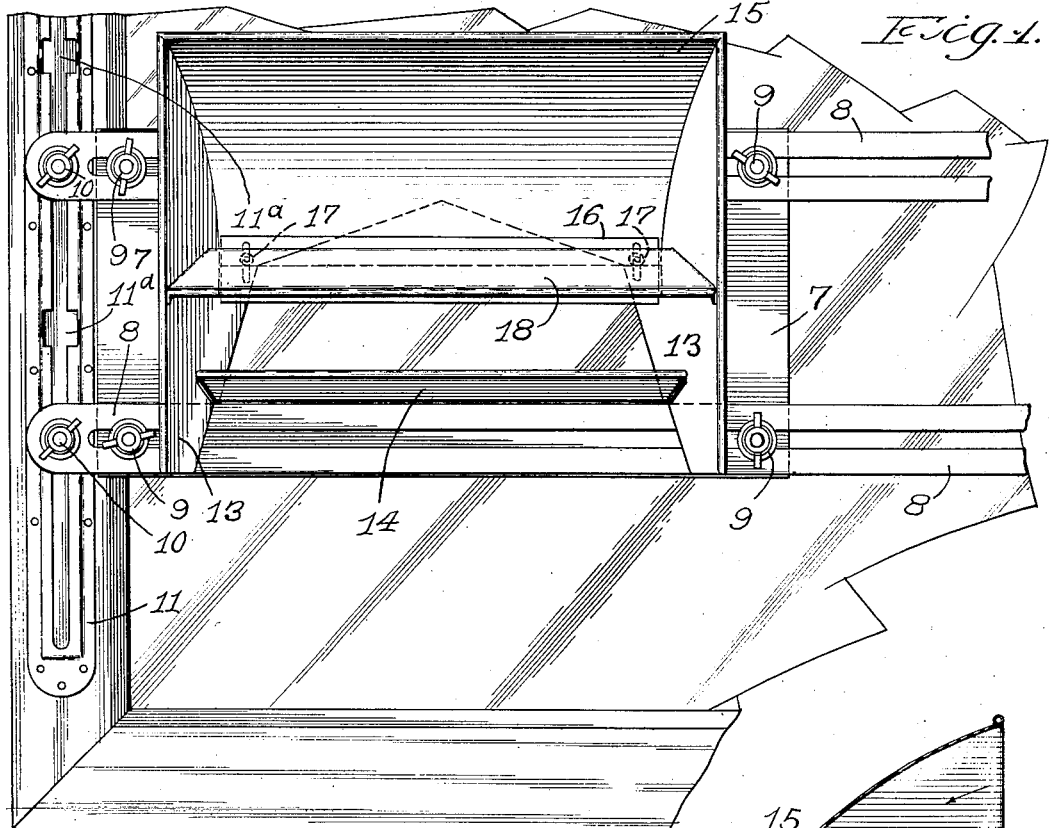
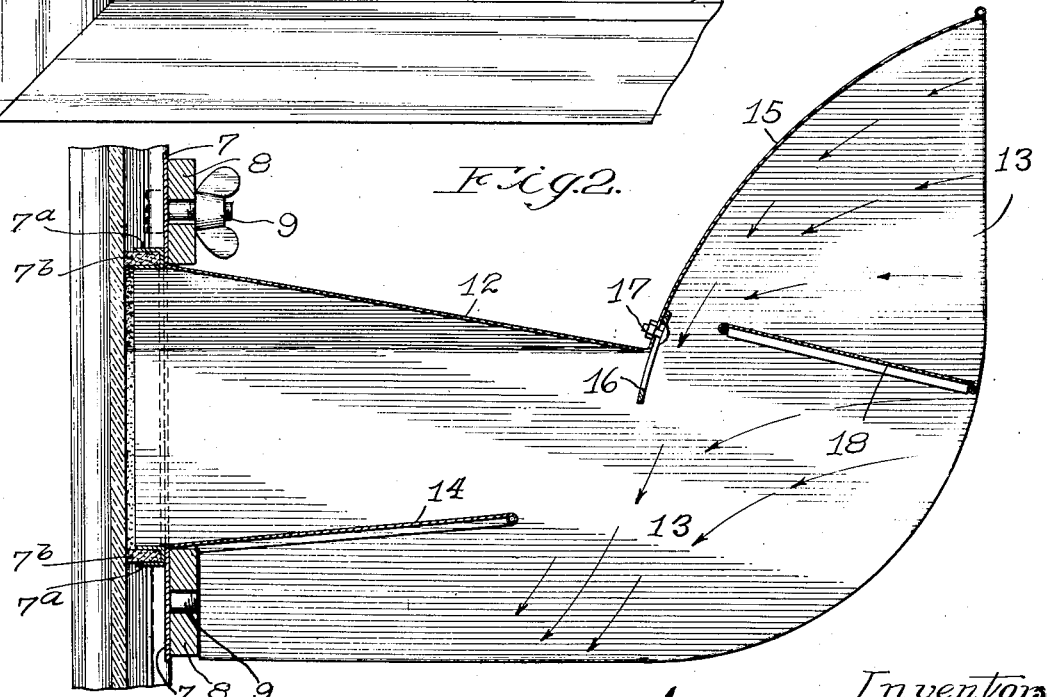

W. J. LEIGHTY & B. H. KRAFFT.
STORM SHIELD.
APPLICATION FILED MAY 12, 1913.
1,186,010.
Patented June 6, 1916.
2 SHEETS—SHEET 2.
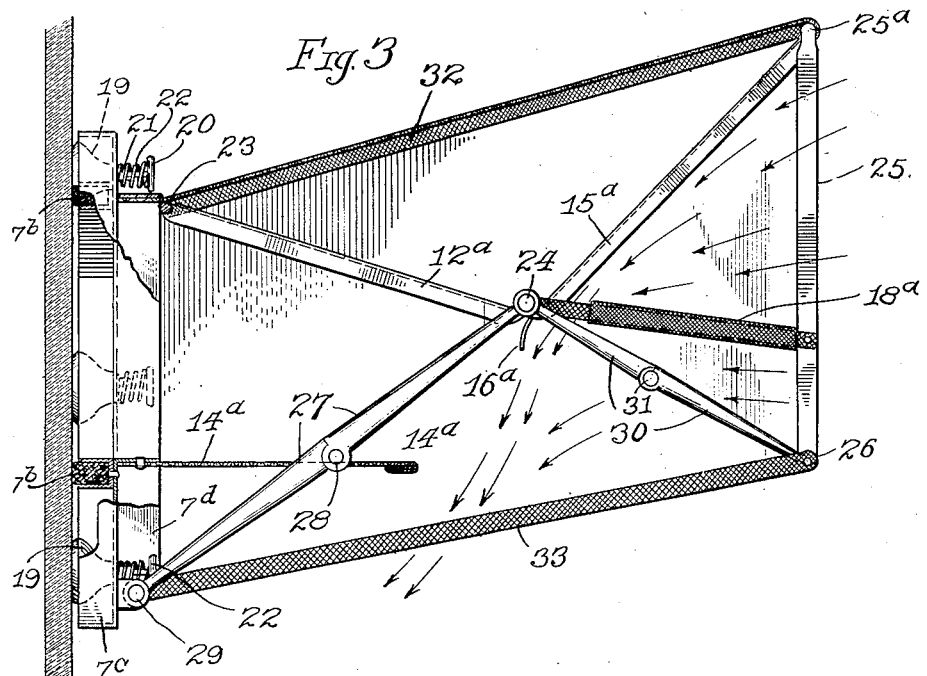
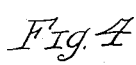
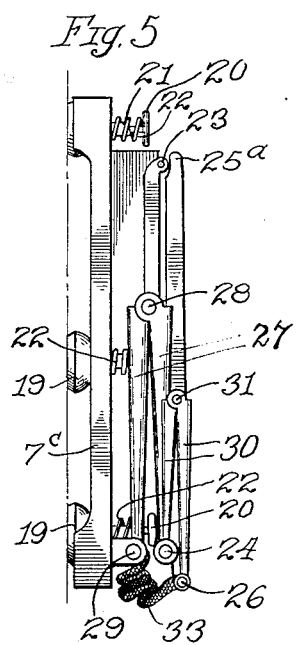
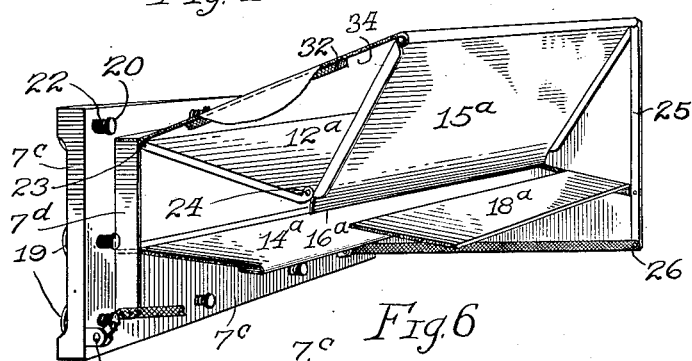
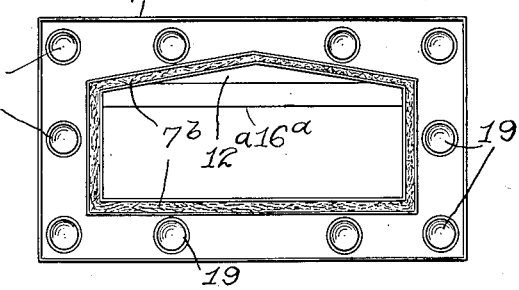

UNITED STATES PATENT OFFICE.

WILLIAM J. LEIGHTY AND BERT H. KRAFFT, OF CHICAGO, ILLINOIS.

STORM-SHIELD.

1,186,010.　　　　　Specification of Letters Patent.　　Patented June 6, 1916.

Application filed May 12, 1913. Serial No. 767,214.

*To all whom it may concern:*

Be it known that we, WILLIAM J. LEIGHTY and BERT H. KRAFFT, citizens of the United States, and residents of Chicago, in the county of Cook and State of Illinois, have invented certain new and useful Improvements in Storm-Shields, of which the following is a description, reference being had to the accompanying drawings, which form a part of our specification.

Our invention relates to storm shields more especially adapted for use on the window of a locomotive cab, the vestibule window of a street car, the wind shield of an automobile, or on other vehicles or structures, having for its object the provision of means whereby a portion of the window of a locomotive or street car, or wind shield of an automobile, may be protected against storm, such as rain, snow, sleet and the like, and thus afford at all times an unobstructed view of the road ahead.

In the drawings:—Figure 1 is a front elevation of our device attached to a window, the window being shown only in part. Fig. 2 is a sectional side elevation of Fig. 1, more clearly showing the constructional details. Fig. 3 is a side elevation of a modified form of our invention, illustrating a collapsible or folding shield, the covering being partially removed in order to show the frame construction within. Fig. 4 is a sectional perspective view of Fig. 3, showing the operative construction or frame portion of the device. Fig. 5 is a side elevation of the device illustrated in Fig. 3, showing the device in collapsed or folded condition. Fig. 6 is an end elevation showing the same construction shown in Fig. 3.

The invention as illustrated in Figs. 1 and 2, shows the construction attached to a window of the vestibule of a street car or a locomotive cab, wherein a more or less permanent method of fastening may be employed.

The storm shield, as illustrated in the drawings, comprises a base portion 7, of any suitable shape, preferably rectangular as shown in the drawings, to which are secured the slotted bars 8; the slotted bars being shown secured to the base of the shield by means of the thumb nut 9; the slotted bars and thumb nut permitting of any horizontal adjustment of the shield. For example when the thumb nut and bolt 9 are loosened, the shield may be slid along the bars 8, as is clearly evident from the construction shown.

In the particular exemplification of the invention as shown in Figs. 1 and 2, the slotted bars 8, 8, are secured to the window sash or frame by means of the bolts and thumb nuts 10, in Fig. 1, the heads whereof engage in the slots of the slotted plates 11 which are secured in any suitable manner to the sash of the window as clearly shown in Fig. 1. It is evident from the construction shown and described that by loosening the nuts 10, the shield may be given any vertical adjustment desired; and at suitable points, the slots in the plates 11 are provided with cut-out portions as shown at 11ª which permit the heads of the bolts 10 to be inserted into the slots and withdrawn as is clearly evident from the construction. The face of the shield is provided with elastic means of any suitable material, preferably waterproof felt, as clearly indicated at 7ᵇ in Fig. 2; the elastic means being inserted in a suitable shallow formed portion 7ª on the side of the base adjacent to the glass in order that the elements, such as snow, rain, and the like, may be prevented from entering between the base of the shield and the glass, and at the same time the elastic means will provide an inclosed air space within the base of the shield so as to prevent the passage of air. The body of the shield consists of a top wall 12 and the two side walls 13, 13; the top 12 may be given any desired shape, but preferably it is arched or elevated in the middle at the rear so as to form a proper shedding surface and prevent rain and moisture from flowing toward the elastic means secured between the base of the shield and the glass. At a suitable point between the upper and lower edges of the side walls 13 and extending transversely of the shield, we provide a bottom portion 14 which is secured to the side walls as is shown in Fig. 1; the bottom portion 14 preferably being given somewhat upward inclination toward the outer end of the shield as clearly shown in Fig. 2. This bottom portion 14, together with the elastic means secured to the base of the shield and which securely engages the glass of the window, forms a chamber which tends to inclose the air in the rear end of the shield. The top 12 terminates at the forward end thereof in a deflecting hood portion 15, which may be made integral therewith as shown in the drawings. At the juncture of the top 12 and the hood portion 15, and within the shield, we provide the depending member 16, which extends transversely of the shield and is preferably adjustably secured to the top as shown by the bolt and nut 17. This depending member or strip 16 causes the elements, snow, rain, and the like, that are deflected downward by the deflecting hood 15, to drip off instead of running backward on the under surface of the top of the body of the shield where it might drip onto the bottom portion 14. Secured between the side walls of the shield and at the front end thereof, we provide the transversely extending member or deflector 18, the ends whereof are secured to the side walls of the shield, with the front edge thereof terminating preferably at the forward edge of the shield, while the rear edge or side of the member or deflector 18 terminates at a point forward of the hood portion of the shield, as shown in Fig. 2. This member or deflector 18 is arranged at an incline, so that the rear or inward edge thereof is at an elevation above that of the forward end thereof as shown; the rear edge of member 18 being preferably in a plane above the plane of the juncture of the roof 12 and the hood portion 15. The member 18 intercepts any rain or snow that may blow into the deflecting hood 15 and thus further protects the air space in the rear part of the body portion of the shield; and this member 18 also tends to compress the air collected by the deflecting hood 15 and causes it to flow downward past the rear of the deflector, with a greater velocity than it would otherwise; the air being compelled to pass through the confined passage to the rear of the member or deflector 18 and the hood portion 15, as shown in Fig. 2; and the increased velocity of the air rushing through the passage creates a more effective deflecting current of air for the protection of the open space between the roof 12 of the storm shield and the front end of the bottom or member 14. As shown in Fig. 2, the forward end of the bottom portion 14 is placed far enough to the rear of the strip or member 16 to be out of the path of the deflected current of air caused by deflecting hood 15 and the current of air passing beneath the deflecting member 18.

By constructing the storm shield so that its base will come into close contact with the glass of the window, which in the particular instance as shown in the drawings is caused by the elastic means 7$^b$, it is evident that a substantially air-tight juncture is formed, thereby producing a dead air space intermediate of the top 12 and the bottom portion 14, with the result that rain and snow will not enter the space within the main or body portion of the shield intermediate of the top 12 and the bottom portion 14, but on the contrary any rain or snow that enters the deflecting hood 15 will be carried by the rushing current of air past the deflecting member 16 and the forward end of bottom portion 14 in the manner clearly indicated by the arrows in Fig. 2.

In Figs. 3, 4, 5, and 6, we show a modified form of our invention, which, however, embodies all the features of the construction shown in Figs. 1 and 2, the shield shown in these figures differing, however, in that it is intended to collapse or fold as will more fully hereinafter be described. The construction shown in Figs. 3, 4, 5, and 6, also differs from that shown in Figs. 1 and 2 of the drawings in that the permanent method of fastening shown in Figs. 1 and 2 is not employed, but in its stead we illustrate the shield provided with vacuum means whereby the shield may be secured at any point on the window.

The construction shown in Figs. 3, 4, 5, and 6 is provided with the base portion 7$^c$, corresponding substantially with the base 7, Figs. 1 and 2, except that the base 7$^c$ is not provided with the slotted bars 8, but instead the base is provided with a sufficient number of rubber vacuum cups 19, see Figs. 3 and 6, which are secured to the base by means of the bolts or rods 20, which extend through the guide portion 21, see Figs. 3 and 5, the ends of the rods or bolts being provided with heads or finger engaging portions as shown in the figures mentioned, and the cups are held or controlled by the springs 22. The springs 22 permit the rods or bolts 20 to be pressed so as to allow the vacuum cups 19 to engage the glass of the window to which the shield is attached and to hold the base of the shield firmly against the glass; the pressure of the springs 22 against the base of the shield will also firmly press the elastic means or material 7$^b$ against the glass, thereby preventing rain or snow entering between the base of the shield and the glass and at the same time prevent the passage of air so that an inclosed air space will be provided within the base of the shield as described with reference to the construction shown in Figs. 1 and 2; the springs absorbing shocks encountered by the shield. In this construction the top 12$^a$ is hinged at the point 23 to an extended portion of the base 7$^c$, while the opposite or forward end of the top 12$^a$ is also pivotally secured or hinged at the point 24 to the deflecting hood portion 15$^a$. In the construction shown in Figs. 3, 4, 5, and 6, which illustrate a collapsible or folding form of shield, the deflecting hood portion 15$^a$ is preferably not curved, as shown in Fig. 2, so as to permit the shield to fold into a comparatively small space. The deflecting hood portion 15$^a$ has its forward end secured to the compression frame member 25 so as to form a hinge connection at the point 25ª. The compression frame member 25 also has secured to it the forward end of the deflector 18ª; while the lower end of the frame member 25 is pivoted or hinged at 26 to the tension members of the frame. The frame also comprises toggle hinges composed of the members 27, 27, pivotally secured together at 28, with the lower end of the member 27 pivotally secured at 29 to the base of the shield, while the other or upper end of the other member is pivotally secured to the hinge 24; and the toggle hinge composed of members 30, 30, pivotally secured together at 31, with the lower end of one of the members 30 being secured to the hinge 26 while the end of the other member 30 is secured to the hinge 24, as shown in Fig. 3. The ends of the compression frame member 25 as well as the toggle hinge 30 are maintained in their proper position by tension induced by the tension members 32 and 33, which are properly secured to the base of the shield. The tension members 32 and 33 not only serve to properly space the hinges 23, 25ª and 26 and 29, but also serve as supports for the flexible covering 34 which forms the outside top and sides of the storm shield. The hood or shield is so triangulated that on straightening out the toggle members 27, 27, about the hinges 24 and 29, and the toggle members 30, 30, on their hinge 31 and about the hinges 24 and 26, the entire framework becomes rigid and will remain in such condition until the toggle hinges 28 and 31 are broken, which will permit the hood to collapse and fold onto the base of the shield as shown in Fig. 5.

In the construction just described, wherein the top 12ª and deflecting hood portion 15ª are shown preferably made of separate sheets of material, the deflecting hood portion is arranged to extend somewhat beneath the pivotal or hinge point 24, as shown in Figs. 3 and 4, in order to provide the depending deflecting strip or member 16ª, so that in this instance the deflecting member is formed integral with the hood portion; it being understood, however, that if desired, the deflecting member 16ª might be adjustably secured to the hood 15ª in a manner similar to that shown in Fig. 2. The tension members 32 and 33 are composed of flexible material such as tape, wire cable, chain, etc., in order that these members may fold, and with them the outside flexible covering, when it is desired to collapse or fold the shield. In this construction also the bottom portion or member 14ª as well as the member 18ª are preferably made of flexible material similar to the outer covering and these members are secured to the sides of the outer covering in any suitable manner so as to hold them in proper position and at the same time permit them to fold with the outer covering when the toggle hinges are broken; the members 14ª and 18ª being sewed, vulcanized, or riveted to the side portions of the outer covering. In this construction also, we prefer to provide the base 7ᶜ with the forwardly extending frame portion 7ᵈ, within which the flexible covering may be secured, thereby not only providing a better finish but at the same time preventing the rain or snow from entering between the juncture of the flexible covering and the base portion.

In order to fold the storm shield illustrated in Figs. 3, 4, 5, and 6, it is merely necessary to break the hinges 28 and 31 of the toggle members 27, 27, and 30, 30, which will permit the hinges 28 and 31 to move upwardly while the central pivot or hinge 24 will swing downwardly and onto the hinge 29 at the base of the shield, while the hinge 25ª will swing back against the hinge 23, while the member 25 will fold against the hinge 24, as shown in Fig. 5, while the flexible cloth or rubber outer covering together with the bottom portion 14ª and deflector portion 18ª will fold within and about the frame work as the latter is folded together.

It is evident from the construction just described that when the storm shield is not in use, the same may be readily detached from the glass of the window by simply destroying the vacuum in the cups and then breaking the hinge connection as previously described, which will permit the shield to fold up into considerably less space than that required by the rigid construction shown in Figs. 1 and 2, so as to permit the shield to be stored away.

We have shown and described the two forms of our improved storm shield, which, however, permit of a number of modifications being incorporated without, however, departing from the spirit of our invention, and we do not wish to be understood, therefore, as limiting ourselves to the precise construction shown and described.

What we claim is:—

1. A storm shield, comprising a casing provided with means whereby the casing may be secured in place, a member secured within said casing at one end thereof so as to provide an inclosed air space or chamber open at one end when the shield is secured in place, and means whereby the inrushing air will be compressed at a point beyond the forward end of said chamber and deflected past the open end of said chamber.

2. A storm shield, comprising a casing adapted to be secured against a transparent medium and provided with an inclosed air space open at the forward end thereof, and means, located in said casing forward of the open end of the air space, so arranged as to compress and deflect the inrushing air at a point beyond the open end of said inclosed air space.

3. A storm shield, comprising a casing provided with means whereby the shield may be secured against a transparent medium, one end of said casing being provided with an open-ended chamber, a deflecting hood arranged at the forward end of the casing, and a deflector arranged in said hood forward of and above the open end of said chamber, said deflector being arranged so as to incline rearwardly whereby the elements will be intercepted and the deflected air given increased velocity past the forward end of said chamber.

4. A storm shield, comprising a casing adapted to be secured against a transparent medium, said casing being formed with a top, side walls and a bottom so as to provide an open-ended chamber, the top and bottom converging toward the open end of said chamber, upwardly and forwardly presented flaring means at the front end of said casing, a transverse deflector arranged in said means so as to provide a restricted discharge orifice at a point above the open end of said chamber, and means secured to said flaring means at said restricted discharge orifice and depending beneath the latter whereby the intercepted elements will be discharged with increased velocity past the forward open end of said chamber.

5. A storm shield, comprising a casing adapted to be secured against a transparent medium and provided with an open-ended forwardly presented chamber, an upwardly presented deflecting hood, and a rearwardly inclining member secured within said hood so as to provide a passage intermediate of the rear end of said member and the hood at a point forward of the upper end of said open-ended chamber.

6. A storm shield, comprising a casing adapted to be secured against a transparent medium and provided with a forwardly presented open-ended chamber, said casing being provided with an upwardly and forwardly presented portion, a rearwardly inclining member secured within the forward end of the casing and spaced apart from the upwardly presented portion, and a member secured at the base of said forwardly and upwardly presented portion whereby the elements are deflected at a point forward of the upper end of said open-ended chamber.

7. A storm shield, comprising an upper or top wall provided with an intermediate yielding point, sides and bottom walls arranged to provide an open-ended chamber, yielding means adapted to effect an air-tight connection with the object to which the shield is attached so as to provide an inclosed air chamber at the rear end of the shield, frame members for holding said flexible walls under tension, and means whereby said frame members are maintained in proper extended condition.

8. A storm shield, comprising a base portion adapted to be secured against a transparent medium, a forwardly presented hood portion having top and side walls composed of yielding material, a bottom wall at the rear end of said shield arranged to fold or collapse, and toggle means pivotally secured to said base portion whereby the hood portion may be maintained in an extended condition.

9. A storm shield, comprising a base portion adapted to be secured against a transparent medium, a hood portion having top, sides and bottom walls composed of yielding material, with the bottom wall extended forward to a lesser extent than the top and side walls, so as to provide an air space or pocket in the rear portion of the hood, means arranged in the forward end of the hood portion, forward of said air space or pocket, whereby the elements will be intercepted and deflected past the air space or pocket, and collapsible means whereby the hood will be maintained in a distended condition.

10. A storm shield, comprising a two-part upper wall provided with an intermediate pivotal point, the one part being presented forwardly and upwardly, means whereby an inclosed air chamber is formed beneath the rear part of said upper wall, collapsible means whereby said wall and the first mentioned means are maintained in proper extended condition, and means secured beneath the forward part of said upper wall whereby the elements will be intercepted and deflected past the air space or pocket.

11. A storm shield, comprising a base portion adapted to be adjustably secured against a transparent medium, a forwardly presented hood portion pivotally secured to the base portion and provided with an inclosed air space or pocket in the rear end of the hood portion adjacent to the base portion, said hood portion being composed of yielding material formed so as to permit the hood portion to fold or collapse, and means whereby the hood portion is maintained in an extended condition.

12. A storm shield, comprising a base portion adapted to be adjustably secured against a transparent medium, yielding means whereby a tight connection with the transparent medium may be effected, an upper wall provided with an intermediate yielding point, the portion of the wall forward of the yielding point being presented upwardly, a bottom member secured to said base rearward of the intermediate yielding point of the upper wall, yielding means whereby an inclosed air chamber is formed intermediate of the bottom portion and the rear portion of said upper wall; means arranged beneath the forward part of said upper wall and forward of the intermediate yielding point whereby the elements will be intercepted, and means for maintaining the parts in proper extended condition.

WILLIAM J. LEIGHTY.
BERT H. KRAFFT.

Witnesses:
 GEORGE HEIDMAN,
 R. E. WIGHTON.